(12) United States Patent
Lempel et al.

(10) Patent No.: US 7,290,179 B2
(45) Date of Patent: Oct. 30, 2007

(54) SYSTEM AND METHOD FOR SOFT ERROR HANDLING

(75) Inventors: Oded Lempel, Moshav Amikam (IL); Ittai Anati, Haifa (IL); Zeev Offen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 10/724,053

(22) Filed: Dec. 1, 2003

(65) Prior Publication Data

US 2005/0149781 A1 Jul. 7, 2005

(51) Int. Cl.
*G06F 11/00* (2006.01)
(52) U.S. Cl. .................. 714/42; 714/5; 714/48
(58) Field of Classification Search .................. 714/5, 714/42, 48
See application file for complete search history.

(56) References Cited

U.S. PATENT DOCUMENTS

| | | | | | |
|---|---|---|---|---|---|
| 5,361,267 | A | * | 11/1994 | Godiwala et al. | 714/755 |
| 5,912,906 | A | * | 6/1999 | Wu et al. | 714/763 |
| 6,332,181 | B1 | * | 12/2001 | Bossen et al. | 711/155 |
| 6,802,039 | B1 | * | 10/2004 | Quach et al. | 714/763 |
| 7,007,210 | B2 | * | 2/2006 | Fields et al. | 714/718 |
| 2003/0023932 | A1 | * | 1/2003 | Arndt et al. | 714/805 |
| 2003/0131277 | A1 | * | 7/2003 | Taylor et al. | 714/5 |

* cited by examiner

*Primary Examiner*—Robert Beausoliel
*Assistant Examiner*—Charles Ehne
(74) *Attorney, Agent, or Firm*—Kenyon & Kenyon LLP

(57) ABSTRACT

Embodiments of the present invention relate to detecting and clearing a soft error in a cache.

16 Claims, 5 Drawing Sheets

SYSTEM AND METHOD FOR SOFT ERROR HANDLING

FIELD OF THE INVENTION

The present invention relates generally to computer systems, and more specifically to a system and method for handling soft errors in cache memory.

BACKGROUND OF THE INVENTION

"Soft error" is a term that is used to describe random corruption of data in computer memory. Such corruption may be caused, for example, by particles in normal environmental radiation. More specifically, for example, alpha particles may cause bits in electronic data to randomly "flip" in value, introducing the possibility of error into the data.

Modern computer processors have tended to have increasingly large caches, and correspondingly, an increasing probability of encountering soft errors. Methods of handling soft errors in caches are known. In some methods, the soft error is detected, but no steps are taken to recover from the error; instead, operations are simply shut down. For example, in known processors, parity checking is performed to detect soft errors in the instruction cache. If a soft error is detected, a "machine check error" is signaled to retirement logic, which uses this indication to shut down the processor on the next end of instruction, or divert to the non-recoverable machine check exception handler. Consequently, to continue working, the computer system must be re-booted.

In other methods, an effort is made to recover from soft errors without shutting down. One such known method uses ECC (error correction circuitry). ECC is additional hardware logic built into a cache; the logic is able to detect soft errors and execute a hardware algorithm to correct them. However, a disadvantage of ECC is that the additional hardware takes up space on the silicon and requires time to perform the needed computations, imposing further area and timing constraints on the overall design. Moreover, an additional cycle is usually added to the cache access time in order to accommodate the ECC's soft error correction logic, adversely impacting processor performance even when no soft errors are detected.

An approach is needed for handling soft errors in view of the foregoing considerations.

DETAILED DESCRIPTION

In a method and system according to embodiments of the invention, soft errors are handled without needing to shut down the computer, and without requiring expensive special error correction circuitry. According to the embodiments, a soft error may be detected in a cache while data stored in the cache is being fetched as part of processor operations. When the soft error is detected, the fetching of instructions from the cache may be stopped, and the soft error may be cleared from the cache. The soft error may be cleared at an entire cache level, an individual cache line level, or at some intermediate level between the entire cache level and the cache line level. Fetching of data from the cache may then be resumed.

More specifically, when the soft error is detected, the retirement logic of the computer is not automatically signaled to cause the computer to automatically shut down, as in the prior art. Instead, operations normally associated with the "front end" of a computer processor, such as instruction fetch, may be paused while microcode according to embodiments of the invention executes to clear the soft error. Normal front end operations, including instruction fetch, may resume once the soft error is cleared.

Figure 1:
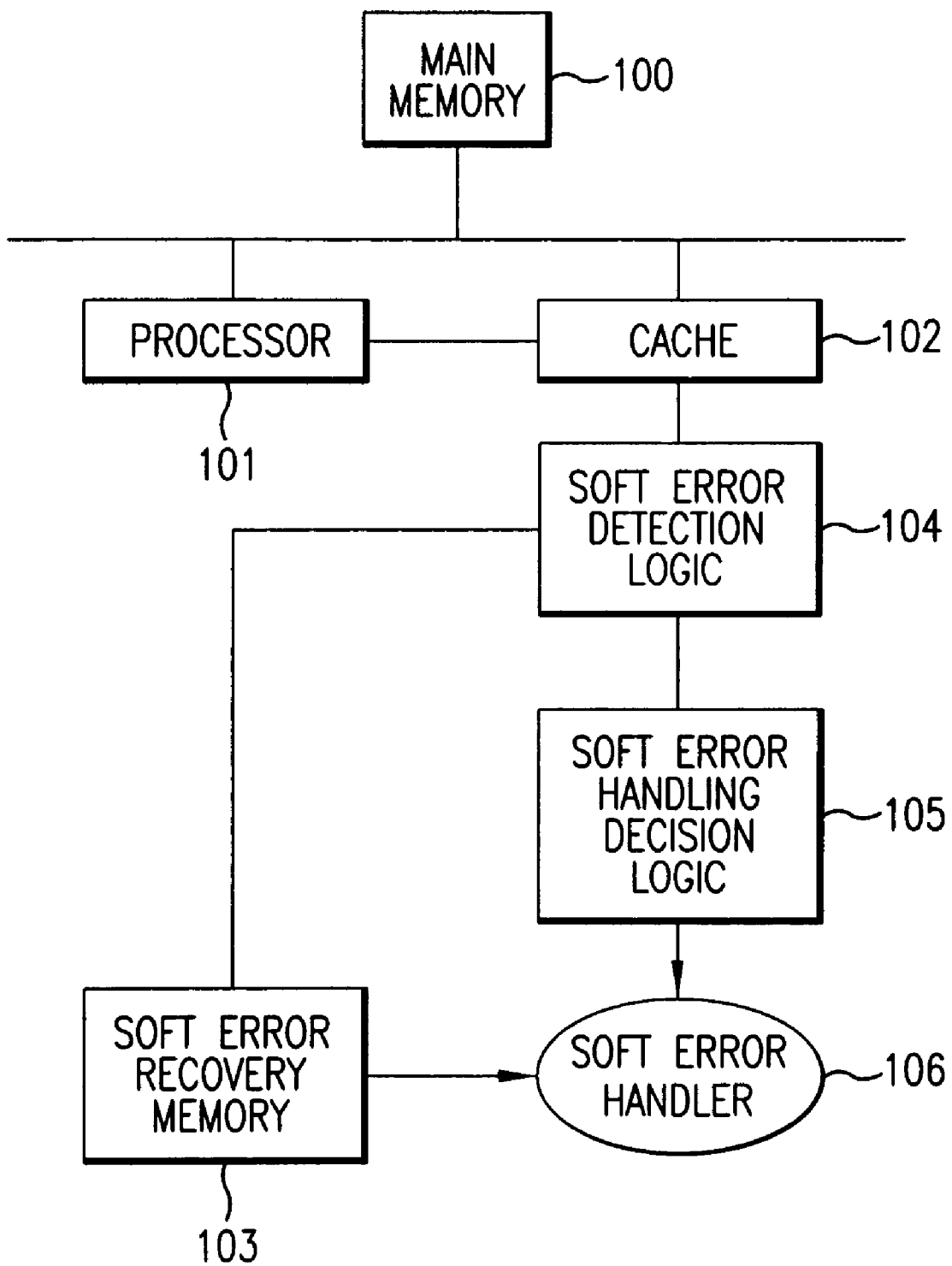
FIG. 1 illustrates a system according to embodiments of the invention.

FIG. 1 illustrates a system according to embodiments of the present invention. The system may include a main memory 100 coupled to a processor or CPU 101 and a cache 102. The cache 102 may be coupled to processor 101. As is conventional, the cache may be a fast memory located close to the processor, and loaded with program instructions and other data obtained from the main memory. The processor may fetch data from the cache to reduce the latency associated with accessing the main memory.

According to the embodiments, the cache 102 may be coupled to or include soft error detection logic 104. The soft error detection logic may be configured to detect soft errors in data loaded into the cache, for example by parity checking. The cache may further be coupled to a soft error recovery memory 103 adapted to store or save information associated with recovering from a soft error. For example, the soft error recovery memory may be implemented as a register that stores a location within the cache where the soft error was detected.

The cache 102 may further be coupled to or include soft error handling decision logic 105. The soft error handling decision logic may be configured to make a determination as to whether to invoke a soft error handler 106 depending on information received from the soft error detection logic. The soft error handler 106 may be implemented as microcode, and may receive information from the soft error recovery memory 103 as input.

Figure 2:
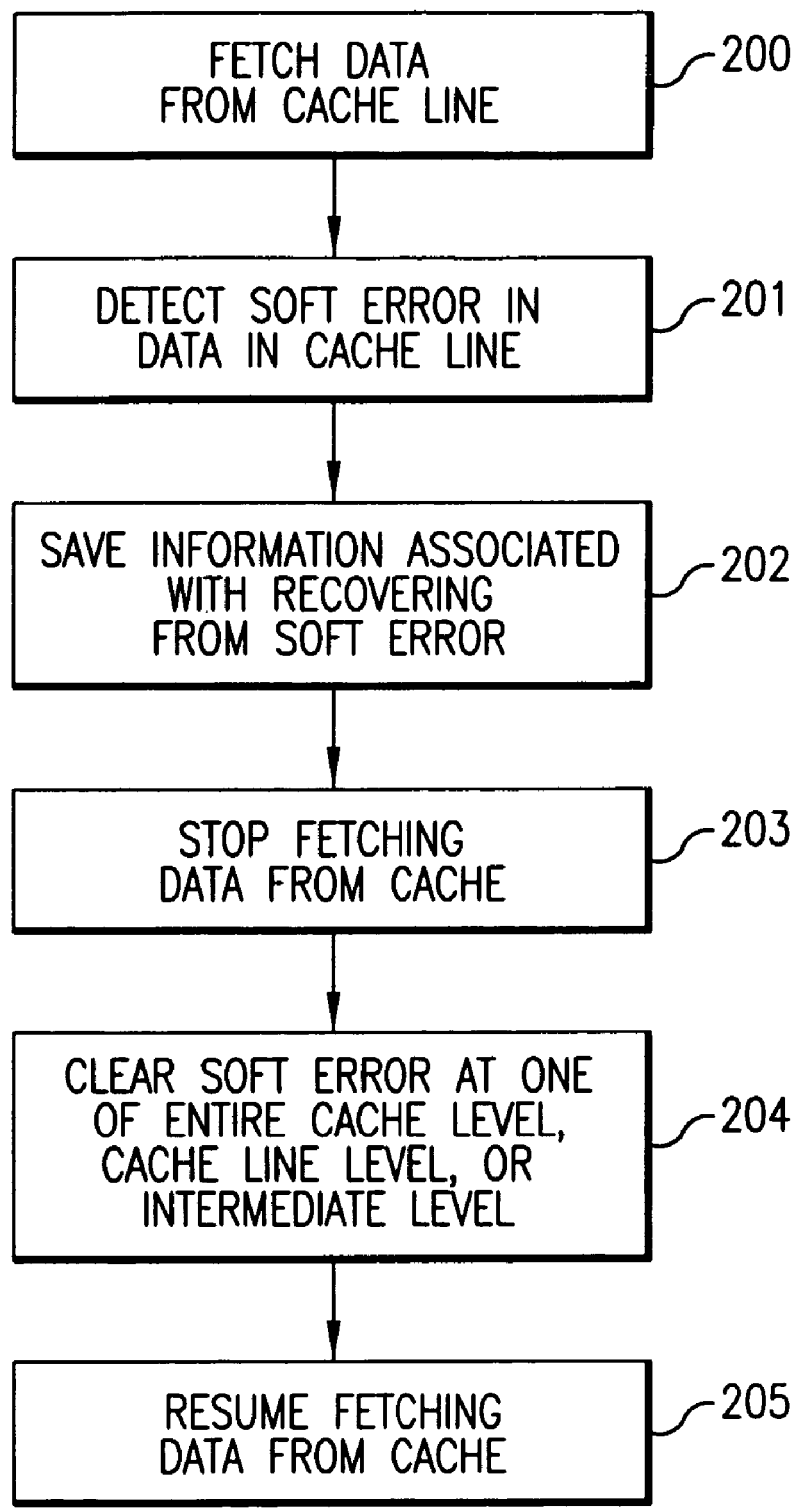
FIG. 2 shows a process flow according to embodiments.

FIG. 2 illustrates a process flow according to embodiments of the invention. Cached data may be fetched from the cache as shown in block 200. In block 201, as part of the fetch process but before the fetch is complete, a soft error may be detected in the cache, for example using parity checking. Information associated with recovering from the soft error may be stored, as shown in block 202; this operation may be performed substantially in parallel with or concurrently with a fetch or read of a current cache line, as described in more detail in the following. The fetching of data from the cache may then be stopped, as shown in block 203. To do this, the normal operations of the processor may be stalled. In these embodiments, "stalled" includes the meaning of recoverably stopped. More specifically, operations of the front end of the processor, which is typically involved in such pre-execution operations as instruction fetch, may be paused and then subsequently resumed at the same point they left off. During this stall condition, a microcode sequencer included in the computer system may be invoked, and microcode according to embodiments of the invention may be executed. The microcode may flow through the execution pipeline without passing through the front end; i.e., without requiring instruction fetch and other operations associated with the front end.

As a result of executing the microcode, at least a portion of the cache containing the soft error may be cleared. The soft error may be cleared at one of a full cache level, a cache line level, or an intermediate level between the full cache level and the cache line level, block 204. To clear the soft error at the full cache level, a cache flush operation may be performed. To clear the soft error at the cache line level, a known operation to "invalidate" the cache line may be performed. To clear the soft error at the intermediate level, a range of cache address space between the full cache and a single cache line, but including the cache line in which the soft error has been detected, may be cleared, using known methods. Because data required by the processor will now be absent from the cache, a "cache miss" will be generated and the cache, or a line or portions thereof, will begin to refill from the memory. Error correction circuitry may be provided on a path from the memory to the cache to ensure that data obtained is "clean"; i.e., free of soft errors. The stall condition of the processor front end may be terminated, and fetching of data from the cache may then be resumed, block 205, from the address of the next instruction to be executed.

Figure 3:
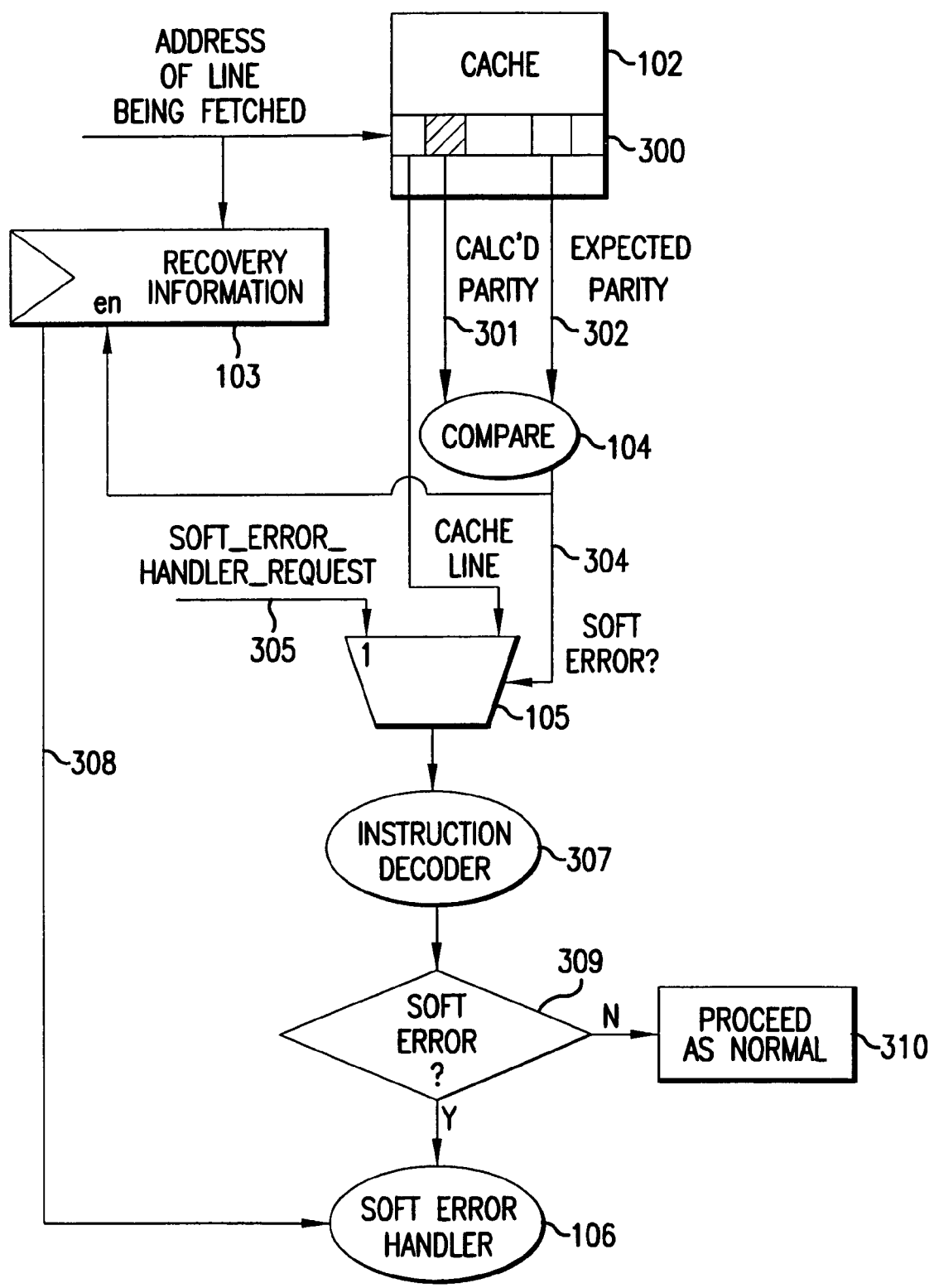
FIG. 3 shows a system according to embodiments.

FIG. 3 shows components of a system according to embodiments of the invention. In FIG. 3, a cache 102 contains at least one cache line 300. The cache line 300 corresponds to data, for example, program instructions, application or user data, and internal flags and state data, associated with operations being performed by a processor. As part of the operation of fetching data from the cache line, a calculated parity 301 and an expected parity 302 for the cache line may be generated. The expected parity may be generated, for example, when data loaded into the cache is retrieved from a less proximate memory such as an L2 cache or from main memory 100 (see FIG. 1) via an external bus. The calculated parity may be calculated when the data is read out of the cache 102.

The expected parity 301 and the calculated parity 302 may be compared by soft error detection logic 104. According to embodiments of the present invention, the soft error detection logic 104 may be coupled to soft error handling decision logic 105, which may be implemented, for example, as a multiplexer. The soft error detection logic 104 may output a soft error indicator signal 304 that is input to the soft error decision logic 105. The soft error decision logic may also have as possible inputs the data in the cache line 300 currently being checked for soft errors, and a soft error handler request 305.

The soft error indicator signal 304 may act as a decision criterion for the decision logic 105. More specifically, depending on a state or value of the soft error indicator signal 304, the decision logic 105 may select as input either the data in the cache line 300 currently being fetched, or the soft error handler request 305. If the state or value of the soft error indicator signal 304 indicates that there is no soft error present in the data in the cache line 300 currently being fetched, the decision logic 105 may select as input the data in the cache line 300 currently being fetched, and operations may proceed as normal. That is, for example in an embodiment as illustrated in FIG. 3, the data corresponding to the cache line currently being fetched may decoded by an instruction decoder 307. As shown in block 309, if the selected input to the decision logic 105 was the data from the cache line, operations will proceed as normal (block 310): for example, an instruction corresponding to the fetched data may be executed. The decision represented by block 309 may be implicit in the function of the decoder 307. It is noted that the input to the decision logic 105 need not be directly from the cache line 300. Instead, the input to the decision logic could be the output of a latch, a rotator or any other structure for decoding instructions.

If the state or value of the soft error indicator signal 304 indicates that there is a soft error present in the cache line currently being fetched, the decision logic 105 may select as input the soft error handler request 305. The soft error handler request may, instead of the data in the cache line in which the soft error was detected, be decoded by the instruction decoder 307, and as a result, the soft error handler 106 may be called or invoked. The soft error handler 106 may be implemented, for example, in microcode.

As further shown in FIG. 3, the soft error indicator signal 304 may also be input to the software error recovery memory 103. The soft error recovery memory 103 may be implemented, for example, as a register. The soft error indicator signal 304 may function as an enabling input that causes information associated with recovering from the soft error to be stored in the register. The information saved in the register may be, for example, the address or index of the cache line within the cache, or other information that enables locating the line within the cache. As shown in the embodiment of FIG. 3, when enabled by the soft error indicator signal 304, the register 103 may store the address or index of the cache line currently being fetched that has just been identified as containing a soft error, and supply it (line 308) to the soft error handler 106.

Figure 4:
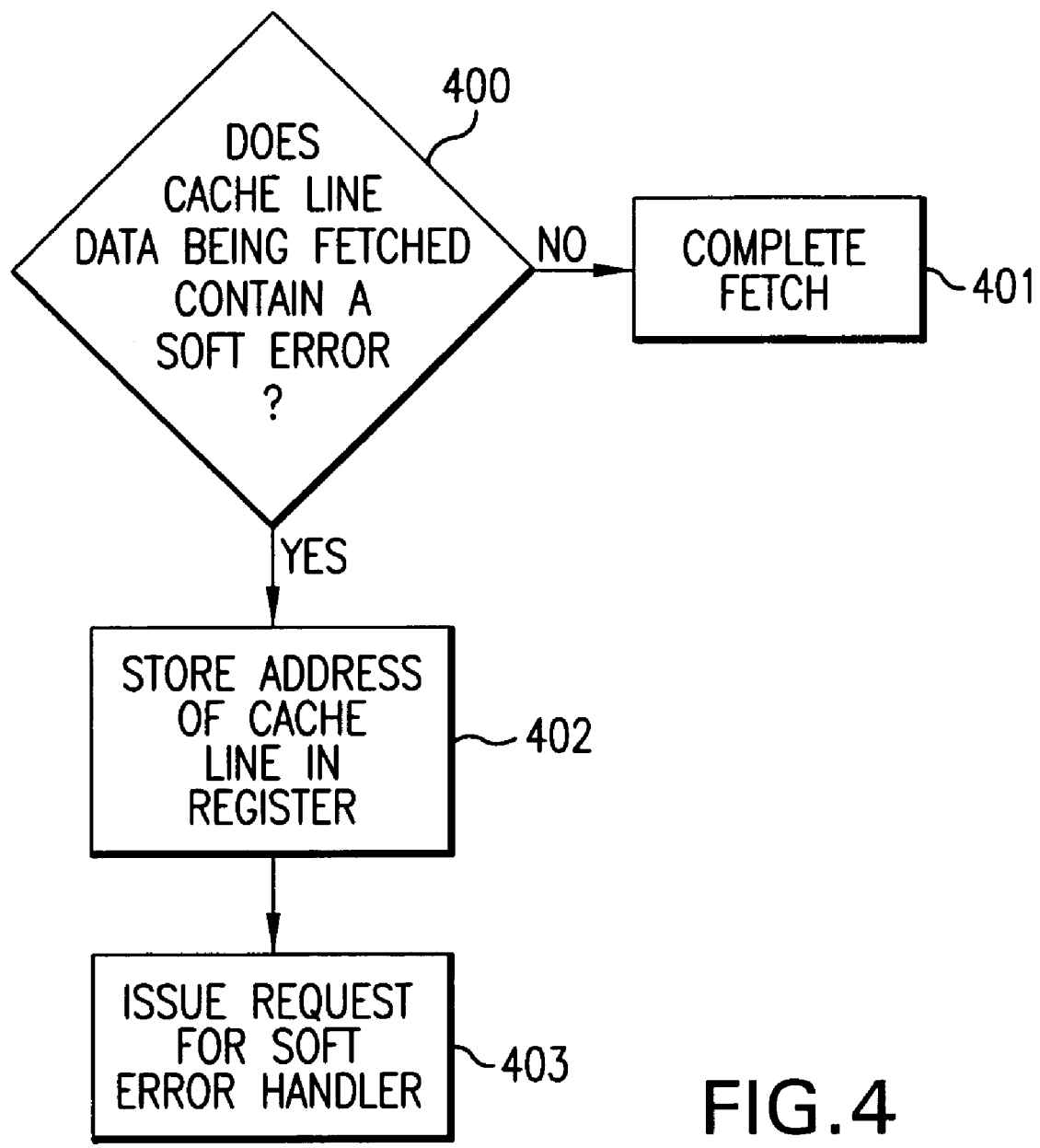
FIGS. 4 and 5 show process flows according to embodiments.

FIG. 4 shows a process flow for the soft error detection corresponding to FIG. 3. As shown in block 400, it may be determined while fetching data in a cache line whether it contains a soft error. If not, the fetch of the data in the cache line may be completed, block 401. On the other hand, if a soft error is detected in the data in the cache line being fetched, the address of the cache line may be stored in a register, block 402, and a request to the soft error handler may be issued, block 403.

Figure 5:
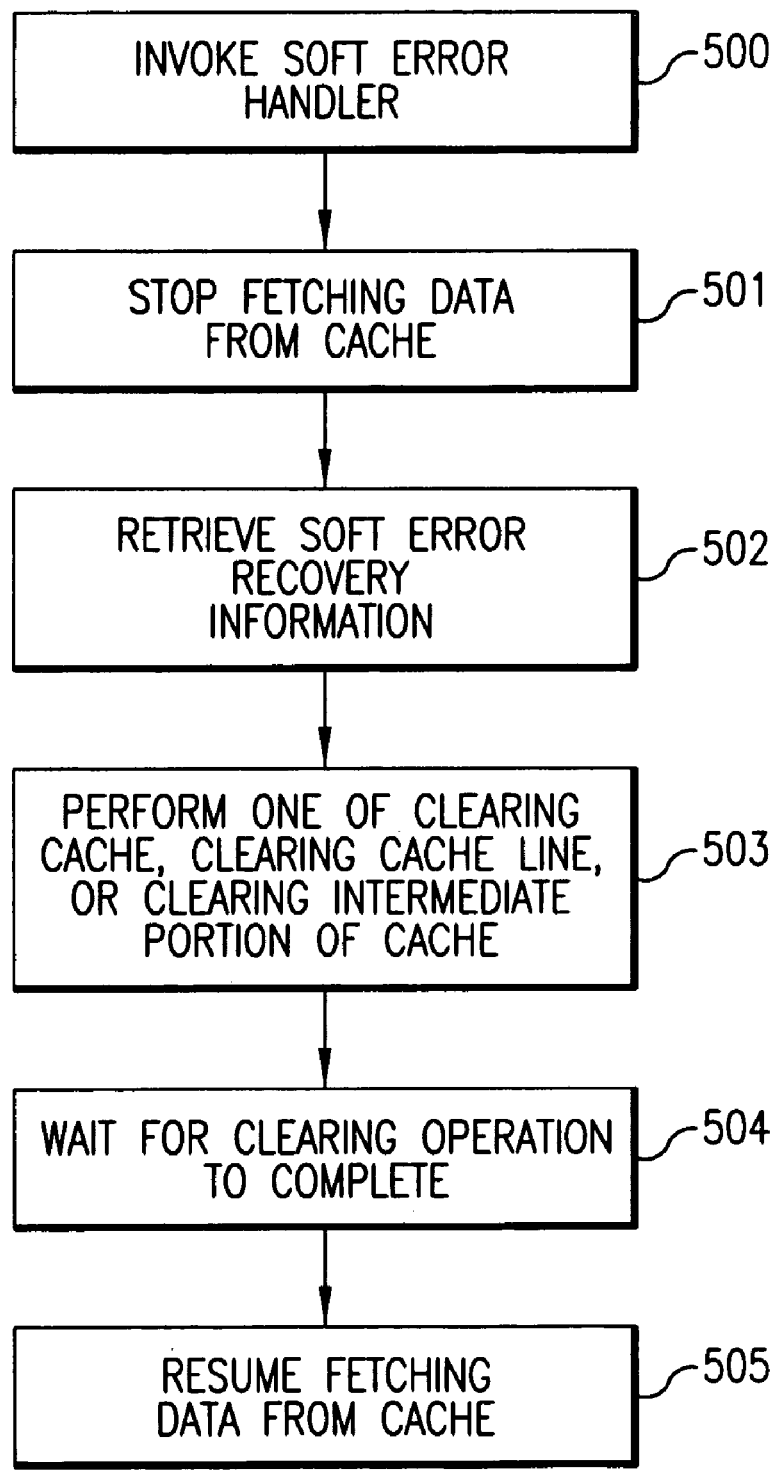

FIG. 5 illustrates a process flow for the soft error handler according to embodiments. A soft error handler routine implemented in computer-executable instructions may be invoked by soft error handling decision logic, block 500. The soft error handler may then cause the fetching of data from the cache to be stopped, for example by stalling the front end, block 501. Stalling the front end may, for example, involve stopping the IFU (Instruction Fetch Unit).

As shown in block 502, the soft error handler may then retrieve recovery information from the soft error recovery memory. For example, this information could be the address or index, saved earlier, of the cache line 300 (see FIG. 3) being fetched, in which a soft error was detected. Then, as shown in block 503, the soft error handler may perform a cache clearing operation at one of multiple possible levels. For example, the cache in its entirety may be flushed. Alternatively, only the cache line in which the soft error was detected may be cleared, using the cache line address obtained from the soft error recovery memory. More specifically, the cache line may be "invalidated", which is an operation which on a subsequent fetch to the same address will cause a cache miss to be registered and consequently, the corresponding cache line to be reloaded from external memory. Alternatively, an intermediate portion of the cache, i.e., a range of cache address space between the full cache and a single cache line, but including the cache line in which the soft error has been detected, may be cleared.

A certain number of machine cycles may be needed to effect the desired clearing operation, and thus, the soft error handler may wait for a period of time for the clearing operation to complete, block 504. Then, as shown in block 505, fetching of data from the cache may be resumed at a point before or at the point where the soft error was detected. For example, the IFU may be restarted at the current instruction pointer, which, if the data containing the soft error was an instruction, should correspond to the instruction contained in the cache line where the soft error was detected.

It is noted that a system and method according to embodiments of the invention as described herein would be useful in a number of applications and is not limited to use with an instruction cache. For example, embodiments of the invention could also find useful application in a data cache or a TLB (translation look-aside buffer).

Microcode in the form of computer-executable instructions for implementing operations according to embodiments of the present invention may be stored and transported on a computer-usable medium such as diskette, magnetic tape, disk or CD-ROM. The instructions may be copied or downloaded to fixed storage media such as a programmable read-only memory (PROM) or erasable programmable read-only memory (EPROM) anywhere in a computer, from which they may be invoked and executed to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
   generating an expected parity for data before loading the data into a cache;
   fetching the data from the cache;
   calculating a parity for the fetched data;
   comparing the expected parity with the calculated parity;
   detecting a soft error in the fetched data based on the comparing;
   as a result of detecting the soft error, stalling the computer;
   invoking soft error handler logic to perform one of multiple possible operations to clear the soft error, the multiple possible operations including one of flushing the cache, invalidating a cache line, and clearing an intermediate portion of the cache; and
   resuming fetching of the data.

2. A system comprising:
   a memory;
   a processor coupled to the memory;
   a cache coupled to the processor;
   soft error detection logic coupled to the cache to detect soft errors therein, the soft error detection logic to detect a soft error based on comparing an expected parity with a calculated parity, the expected parity being generated for data before loading the data into the cache, and the calculated parity being calculated for the data while the data is fetched from the cache;
   soft error handling decision logic coupled to the soft error detection logic to invoke soft error handler logic based on an input from the soft error detection logic; and
   soft error handler logic to perform one of multiple possible operations to clear the soft error, the multiple possible operations including one of flushing the cache, invalidating a cache line, and clearing an intermediate portion of the cache.

3. The system of claim 2, further comprising a soft error recovery memory to store information associated with recovering from a soft error.

4. The system of claim 3, wherein the information is an address of a cache line containing a soft error.

5. The system of claim 3, wherein the soft error recovery memory comprises a register.

6. The system of claim 2, wherein the soft error handling decision logic comprises a multiplexer configured to select as input one of data corresponding to a cache line currently being fetched and a request to invoke the soft error handler, depending on a value of an output of the soft error detection logic.

7. A processor comprising:
   a cache;
   soft error detection logic coupled to the cache;
   decision logic to receive at least first, second and third input values, the first input value being a request to invoke a soft error handler, the second input value corresponding to data in a cache line of the cache, and the third input value being an indicator from the soft error detection logic to indicate whether a soft error is present in the data in the cache line, the soft error detection logic to detect a soft error based on comparing expected parity with a calculated parity, the expected parity being generated for data before loading the data into the cache, and the calculated parity being calculated for the data while the data is fetched from the cache; and
   soft error handler logic to perform one of multiple possible operations to clear the soft error, the multiple possible operations including one of flushing the cache, invalidating a cache line, and clearing an intermediate portion of the cache.

8. The processor of claim 7, further comprising a register to store an address of a cache line containing data currently being fetched.

9. The method of claim 1, further comprising:
   after detecting the soft error, storing the address of a cache line corresponding to the soft error in a register.

10. The method of claim 9, wherein the soft error handler logic:
    stops fetching of a sequence of computer instructions from the cache;
    reads the address in the register; and
    clears the corresponding cache line.

11. The method of claim 10, further comprising resuming execution of the sequence of computer instructions at the instruction corresponding to the cleared cache line.

12. A machine-readable medium storing computer-executable instructions which, when executed by a processor, implement a process according to claim 1.

13. The machine-readable medium of claim 12, the process further including reading a memory storing an address of the cache line.

14. The machine-readable medium of claim 12, the process further including invalidating the cache line.

15. An apparatus comprising:
    a cache;
    a comparator coupled to the cache to compare a calculated parity bit and an expected parity bit, the expected parity bit being generated for data before loading the data into the cache, and the calculated parity bit being calculated for the data while the data is fetched from the cache, the comparator including an output coupled to an enable input of a recovery register, the enable input to cause the recovery register to store an address of a cache line identified as containing a soft error; and
    a selector coupled to the cache line, to select one of a soft error handler request or the cache line based on the comparator output, the soft error handler request to invoke a soft error handler, the soft error handler to receive the address of the cache line identified as containing a soft error from the recovery register, and to perform one of multiple possible operations to clear the soft error, the multiple possible operations including one of flushing the cache, invalidating a cache line, and clearing an intermediate portion of the cache.

16. The apparatus of claim 15, wherein the soft error handler comprises microcode.

* * * * *